United States Patent
Ji

(10) Patent No.: US 9,942,245 B2
(45) Date of Patent: Apr. 10, 2018

(54) RESILIENT CONTROL DESIGN FOR DISTRIBUTED CYBER-PHYSICAL SYSTEMS

(71) Applicant: Siemens Aktiengesellschaft, Munich (DE)

(72) Inventor: Kun Ji, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 419 days.

(21) Appl. No.: 14/317,321

(22) Filed: Jun. 27, 2014

(65) Prior Publication Data

US 2015/0378339 A1    Dec. 31, 2015

(51) Int. Cl.
*G06F 19/00*        (2011.01)
*H04L 29/06*        (2006.01)

(52) U.S. Cl.
CPC ........... *H04L 63/1408* (2013.01); *G05B 2219/14082* (2013.01)

(58) Field of Classification Search
CPC ............ H04L 63/1408; G05B 2219/14082
See application file for complete search history.

(56) References Cited

U.S. PATENT DOCUMENTS

| | | | | |
|---|---|---|---|---|
| 2005/0172311 A1* | 8/2005 | Hjelt | ............ | A61B 5/1112 725/10 |
| 2009/0187392 A1* | 7/2009 | Riskey | ............ | A01K 11/007 703/11 |
| 2012/0239335 A1* | 9/2012 | Lachapelle | ...... | G05B 19/042 702/98 |
| 2013/0198847 A1* | 8/2013 | Sampigethaya | .... | H04L 63/1433 726/25 |

FOREIGN PATENT DOCUMENTS

| | | |
|---|---|---|
| GB | 2491237 A | 11/2012 |
| WO | 2013023178 A1 | 2/2013 |

OTHER PUBLICATIONS

PCT International Search Report dated Mar. 18, 2016 corresponding to PCT International Application No. PCT/US2015/036879 filed Jun. 22, 2015 (14 pages).

* cited by examiner

*Primary Examiner* — Michael D Masinick

(57) ABSTRACT

A distributed cyber-physical system includes physical elements (15-1, 15-2, . . . , 15-n) disposed in a physical space (11). Controllers (13-1, 13-2, . . . , 13-n) are disposed in a cyber space (10). Each of the physical elements (15-1, 15-2, . . . , 15-n) corresponds to a corresponding controller (13-1, 13-2, . . . , 13-n). A cyber infrastructure (12) is disposed in the cyber space (10). The cyber infrastructure (12) manages a connection between the controllers (13-1, 13-2, . . . , 13-n) and the physical elements (15-1, 15-2, . . . , 15-n). Control loops (14) are established via the cyber infrastructure (12). Each of the control loops (14) includes a physical element and a corresponding controller. A resilient control agent (31) is configured to monitor each of the control loops (14), determine when one of the control loops (14) is experiencing an adverse condition, reduce a sampling frequency of the control loops (14) that are not experiencing the adverse condition, and increase a sampling frequency of the control loop (14) that is experiencing the adverse condition.

20 Claims, 7 Drawing Sheets

RESILIENT CONTROL DESIGN FOR DISTRIBUTED CYBER-PHYSICAL SYSTEMS

DISCUSSION OF THE RELATED ART

Cyber-physical systems (CPS) are systems in which physical machinery is remotely controlled and monitored via networked computerized components. CPS may be well suited for areas of technology in which human operators are located remotely with respect to the physical machinery they control or instruct. For example, CPS may be well suited for use in space exploration, unmanned aerial vehicles (drones), remote medicine, micro-surgery, and manufacturing in controlled environments such as in a cleanroom or under high/low pressure or temperature.

CPS may be thought of as existing in two distinct domains. Physical elements, which may include machinery capable of manipulating an environment or work piece, may be said to exist within the physical domain or space. In addition to the physical elements, actuators and sensors may be included within the physical space to provide a means of interaction with the physical elements. Conversely, computerized elements involved with networking and/or control (e.g. decision making) may be located within the cyber domain or space.

CPS are becoming increasingly sophisticated and the physical elements may not all be commonly located. The physical space may be distributed over multiple areas. For example, where the physical space includes a set of unmanned aerial vehicles (drones), each drone may be located in a different area even while control of these drones are commonly provided.

Similarly, the computerized components may be distributed. Using principals of distributed computing and cloud-computing, computerized control may be provided by many different sets of computing hardware. By distributing the computerized control, computing resources may be more efficiently utilized and may be able to provide a greater degree of redundancy and power.

CPS in which either or both of the physical elements and the computerized elements are distributed may be referred to herein as Distributed CPS.

While distributed CPS may provide many interesting and powerful features, in addition being susceptible to physical component failure or malfunction, distributed CPS may be vulnerable to cyber-attack and other cyber threats.

SUMMARY

A method for controlling a distributed cyber-physical system includes monitoring a plurality of control loops, each control loop controlling a corresponding physical element within a distributed cyber-physical system. It is determined when one or more of the plurality of control loops experiences an adverse condition. A sampling frequency of those of the plurality of control loops that are not experiencing the adverse condition is reduced. A sampling frequency of those of the plurality of control loops that are experiencing the adverse condition is increased.

Each control loop may include the corresponding physical element which is disposed within a physical space and a controller which is disposed in a cyber space.

Each of the plurality of control loops may include receiving a set point, receiving a sensor signal from a sensor disposed in a physical space, determining an extent to which the received set point aligns with the received sensor signal, generating an actuator signal based on the determined extent of difference, and driving an actuator disposed in the physical space based on the generated actuator signal.

Determining when one or more of the plurality of control loops experiences an adverse condition may be provided based on prognostic information pertaining to either a cyber space or a physical space.

Reducing the sampling frequency may include reducing a number of times that sensor data is transmitted from a physical element within the distributed cyber-physical system to a corresponding controller disposed in a cyber space, per unit time and increasing sampling frequency includes increasing a number of times that sensor data is transmitted from a physical element within the distributed cyber-physical system to a corresponding controller disposed in a cyber space, per unit time.

The adverse condition may be a malicious computer attack or a malfunction or failure of a physical element.

A distributed cyber-physical system includes a plurality of physical elements disposed in a physical space. A plurality of controllers is disposed in a cyber space. Each of the plurality of physical elements corresponds to a corresponding controller of the plurality of controllers. A cyber infrastructure is disposed in a cyber space. The cyber infrastructure manages a connection between the plurality of controllers and the plurality of physical elements. A plurality of control loops is established via the cyber infrastructure. Each of the control loops includes a physical element of the plurality of physical elements and a corresponding controller of the plurality of controllers. A resilient control agent is configured to monitor each of the plurality of control loops, determine when one of the control loops is experiencing an adverse condition, reduce a sampling frequency of the control loops that are not experiencing the adverse condition, and increase a sampling frequency of the control loop that is experiencing the adverse condition.

The resilient control agent may include an observation agent configured to obtain prognostic information of the cyber space, a detection and diagnostic agent configured to determine a presence of an adverse condition, a resilient decision making module configured to determine when and by how much to increase and reduce sampling frequencies, and an execution agent configured to increase and reduce sampling frequencies in the control loops according to the determinations of the resilient decision making module.

Each of the plurality of controller may be configured to receive a set point, receive a sensor signal from a sensor disposed in a physical space, determine an extent to which the received set point aligns with the received sensor signal, generate an actuator signal based on the determined extent of difference, and drive an actuator disposed in the physical space based on the generated actuator signal.

The resilient control agent may be configured to determine when one of the control loops is experiencing an adverse condition based on prognostic information pertaining to either a cyber space or a physical space.

The resilient control agent may be configured to reduce the sampling frequency by reducing a number of times that sensor data is transmitted from a physical element within the distributed cyber-physical system to a corresponding controller disposed in a cyber space, per unit time and increase the sampling frequency by increasing a number of times that sensor data is transmitted from a physical element within the distributed cyber-physical system to a corresponding controller disposed in a cyber space, per unit time.

The adverse condition may be a malicious computer attack or a malfunction or failure of a physical element.

A computer system includes a processor and a non-transitory, tangible, program storage medium, readable by the computer system, embodying a program of instructions executable by the processor to perform method steps for controlling a distributed cyber-physical system. The method includes monitoring a plurality of control loops, each control loop controlling a corresponding physical element within a distributed cyber-physical system. It is determined when one or more of the plurality of control loops experiences an adverse condition. A sampling frequency of those of the plurality of control loops that are not experiencing the adverse condition is reduced. A sampling frequency of those of the plurality of control loops that are experiencing the adverse condition is increased.

Each control loop may include the corresponding physical element which is disposed within a physical space and a controller which is disposed in a cyber space.

Each of the plurality of control loops may receive a set point, receive a sensor signal from a sensor disposed in a physical space, determine an extent to which the received set point aligns with the received sensor signal, generate an actuator signal based on the determined extent of difference, and drive an actuator disposed in the physical space based on the generated actuator signal.

Determining when one or more of the plurality of control loops experiences an adverse condition may be provided based on prognostic information pertaining to either a cyber space or a physical space.

Reducing the sampling frequency may include reducing a number of times that sensor data is transmitted from a physical element within the distributed cyber-physical system to a corresponding controller disposed in a cyber space, per unit time and increasing sampling frequency may include increasing a number of times that sensor data is transmitted from a physical element within the distributed cyber-physical system to a corresponding controller disposed in a cyber space, per unit time.

The adverse condition may be a malicious computer attack or a malfunction or failure of a physical element.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
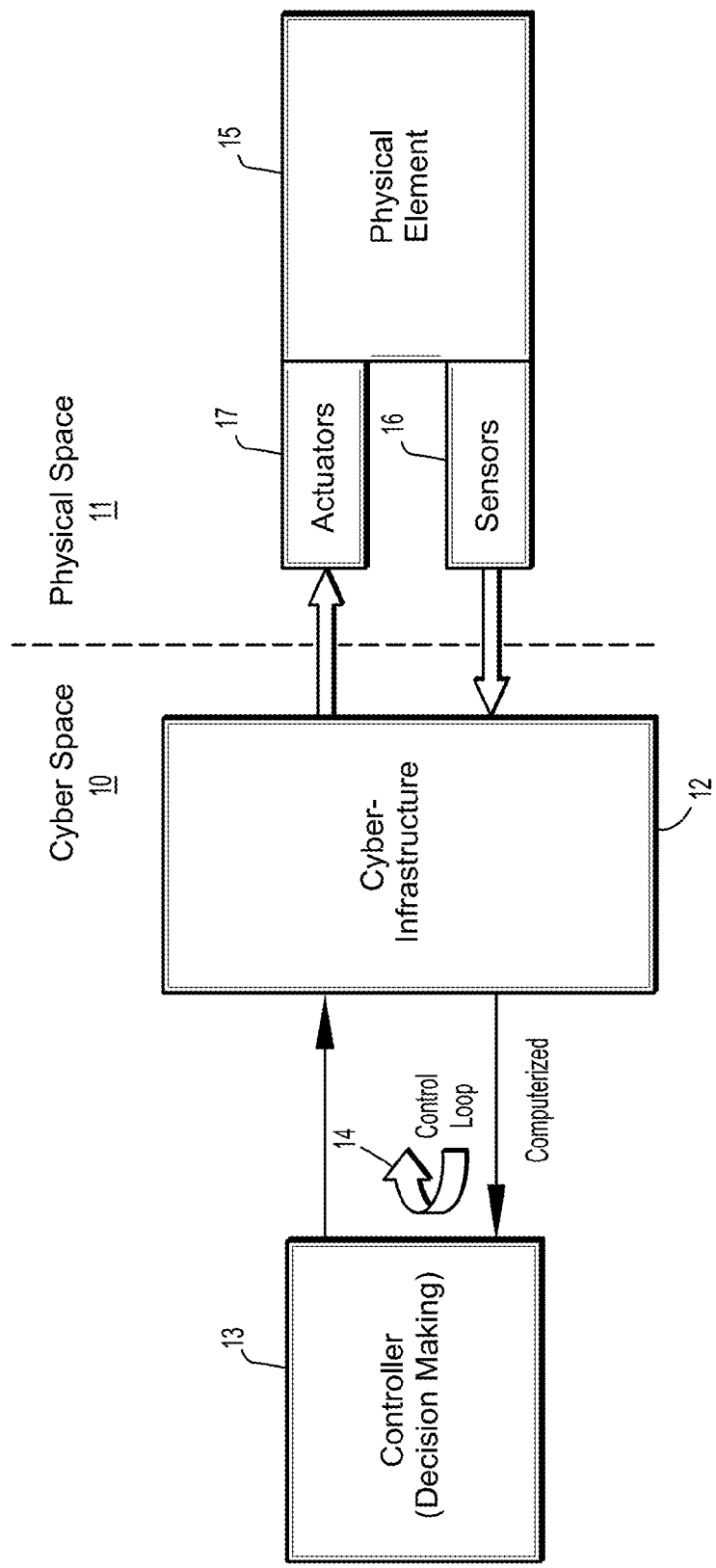
FIG. 1 is a schematic diagram illustrating a cyber-physical system in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide effective control for distributed cyber-physical systems (CPS) that are resilient to malfunction in the physical domain as well as to malicious threats and other challenges to quality of performance (QoP) in the cyber domain.

Exemplary embodiments of the present invention seek to achieve resilient and robust control of the distributed CPS subject to cyber uncertainties such as cyber-attacks and undesired behaviors of physical components such as failed or faulty sensors. Prognostic analysis on both the cyber data and physical data may be utilized to understand anomalies in behavior and support appropriate control actions to mitigate system performance degradation.

Distributed CPS may suffer two types of vulnerability. The first type of vulnerability is in the physical space. Here, vulnerabilities may be caused by faulty or failed physical components. The second type of vulnerability is in the cyber space. Such vulnerabilities may include cyber intrusions and cyber resource limitations. The QoP of distributed CPS may be significantly affected by these two types of vulnerability.

CPS control design may focus exclusively on providing resiliency in either the cyber or physical space and might not consider performance interdependencies among different subsystems. Moreover, CPS control design may rely upon separated offline individual control loop designs which might not be able to cover all the adverse conditions that may occur during whole system run-time operation, and thus may offer poor fault-tolerance and poor cyber security performance.

However, exemplary embodiments of the present invention may utilize cross-layer coupling system models and may consider the performance interdependencies of physical space vulnerabilities and cyber space vulnerabilities of the distributed CPS, thus exemplary embodiments of the present invention may be resilient to both cyber-attacks and adverse behaviors of physical components. By utilizing these cross-layer coupling system models, exemplary embodiments of the present invention may allow individual subsystems to act within their spheres of influence to correctly react to adverse conditions from both the cyber and physical aspects without negatively impacting the other subsystems. The resilience of the whole system may be realized by a "closed-loop control" philosophy enabled by the real-time prognostic analysis of the cyber data and physical data.

FIG. 1 is a schematic diagram illustrating a cyber-physical system. As can be seen from this figure, there are two spaces depicted, the cyber space 10 and the physical space 11. In the cyber space, there is a cyber infrastructure 12 which may include a controller 13 for controlling aspects of the physical space 11. The controller 13 may be responsible for making or executing decisions as to what may happen within the physical space 11. The controller 13 may control based on predetermined programming, artificial intelligence, and/or human-provided commands.

The cyber space 10 may additionally include cyber infrastructure 12 for facilitating a connection between the controller 13 and the physical space 11, via a computer network which may include, for example, the Internet. The cyber infrastructure 12 may include various networking hardware and programming. As the cyber infrastructure 12 may operate over a publicly accessible computer network, such as the Internet, the cyber infrastructure 12, and hence, the controller 13, may be vulnerable to malicious attack and other such problems typical of cyber space 10.

A control loop 14 may be implemented between the controller 13 and the cyber infrastructure 12. The control loop may include transmitting data from sensors 16 located within the physical space 11 to the controller 13 via the cyber infrastructure 12, and transmitting control data from the controller 13 to actuators 17 and other devices for altering the physical space, via the cyber infrastructure 12.

In the physical space 11, the actuators 17 and other such devices may influence physical elements 15 while the sensors 16 may monitor the condition of the physical elements 15.

Figure 2:
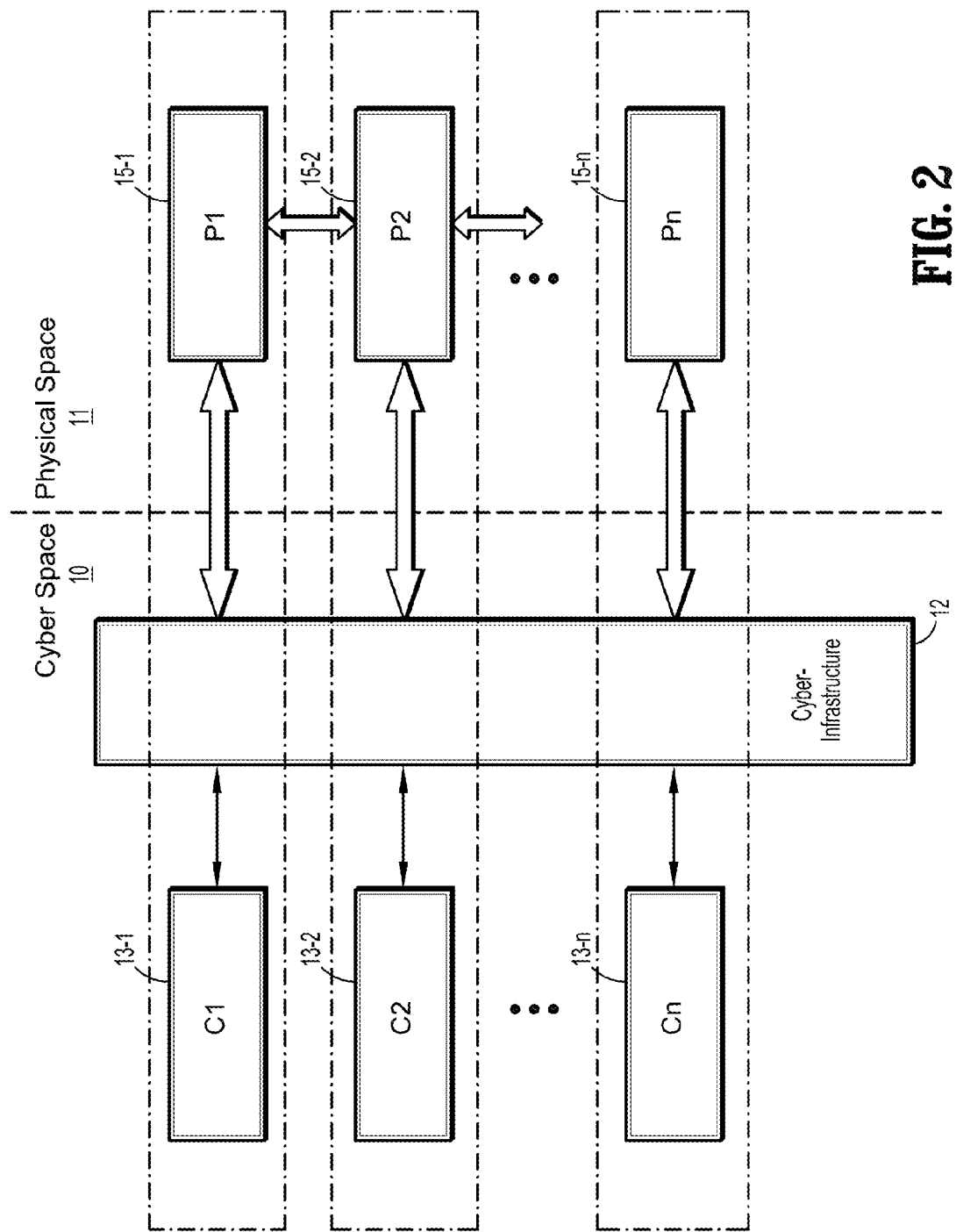
FIG. 2 is a schematic diagram illustrating distributed cyber-physical system in accordance with exemplary embodiments of the present invention.

As discussed above, CPS may also be distributed. FIG. 2 is a schematic diagram illustrating distributed cyber-physical system. As can be seen from this figure, the cyber space 10 may include a plurality of controllers such as C1 (13-1), C2 (13-2), . . . , Cn (13-n) (where n is a positive integer greater than or equal to two). These controllers 13-1 through 13-n may control a set of physical elements such as P1(15-1), P2(15-2), . . . , Pn (15-n) via the cyber infrastructure 12. While this figure illustrates each physical element having a corresponding controller, this is not necessarily the case. Each controller may control multiple physical elements while multiple controllers may control a single physical element. For example, controllers may be arranges such that various controllers control certain aspects of physical elements.

Distributed CPS such as that illustrated in FIG. 2 may therefore be relatively complex owing to multi-layer system integrations as well as distributed interactions among subsystems.

As vulnerabilities in both the physical space and cyber space may affect system performance, quality of performance (QoP), for example, by reducing stability, efficiency, and cyber security, exemplary embodiments of the present invention may provide a resilient control system that is capable of maintaining system QoP as much as possible and may provide defense schemes both at the cyber and physical aspects of the system for reliable and efficient operations.

Figure 3:
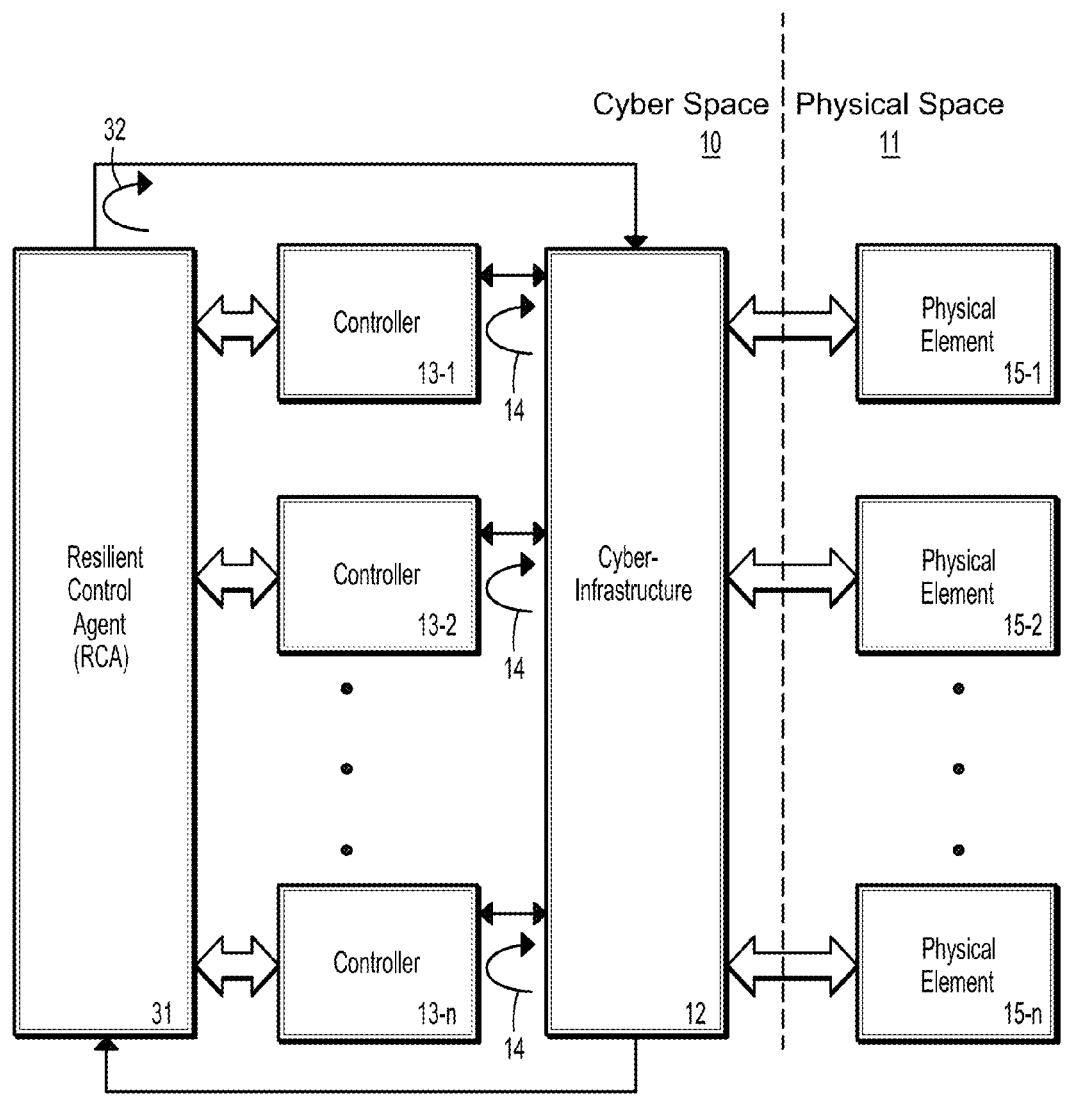
FIG. 3 is a schematic diagram illustrating an approach for implementing resilient control for distributed CPS in accordance with exemplary embodiments of the present invention.

FIG. 3 is a schematic diagram illustrating an approach for implementing resilient control for distributed CPS in accordance with exemplary embodiments of the present invention. As may be seen here, a resilient control feedback loop 32 may be used to maintain QoP during adverse conditions. This loop 32 exists in addition to the feedback loop 14 existing between the controller 13, or each controller 13-1, 13-2, . . . , 13-n and the cyber infrastructure. A resilient control agent (RCA) 31 may be used to establish and maintain this second feedback loop 32.

In accordance with exemplary embodiments of the present invention, the RCA 31 may provide, for each individual CPS loop (e.g. C1+P1 as shown in FIG. 2) local optimization of the conditions of the control system components to fulfill its objective, may provide prognostics on both cyber and physical spaces by monitoring and manipulating the neighboring environment to obtain state awareness of the current CPS loop, may detect and diagnose potential faults and failures such as cyber intrusion, sensor failure, data package drop and delay due to network link compromise, etc., and may perform corrective actions/strategies by adjusting the working conditions and parameters of the controller based control loop 1 and/or provide specific alarms to human operators.

The RCA 31 may include a mechanism for correlation between the cyber and physical aspects of the resilient control design that increases the ability to detect and accurately respond to complex threats that affect the system performance at multiple levels. Exemplary embodiments of the present invention may utilize a Cyber Adaptive Control Parameter Optimization (CACPO) method in the RCA 31 to deliver optimal control performance during run-time and mitigate performance degradation when adverse cyber conditions occur.

During normal conditions, the Quality of Service (QoS) of the cyber space and physical space may be good for each control loop. The RCA 31 may work as a control system QoP optimizer to assign optimal control parameters to the controller to guarantee optimal control performance.

During adverse conditions, the RCA 31 may detect anomalous events such as sensor compromise and cyber-attacks that may affect system performance tied specifically to a corrective action.

Figure 4:
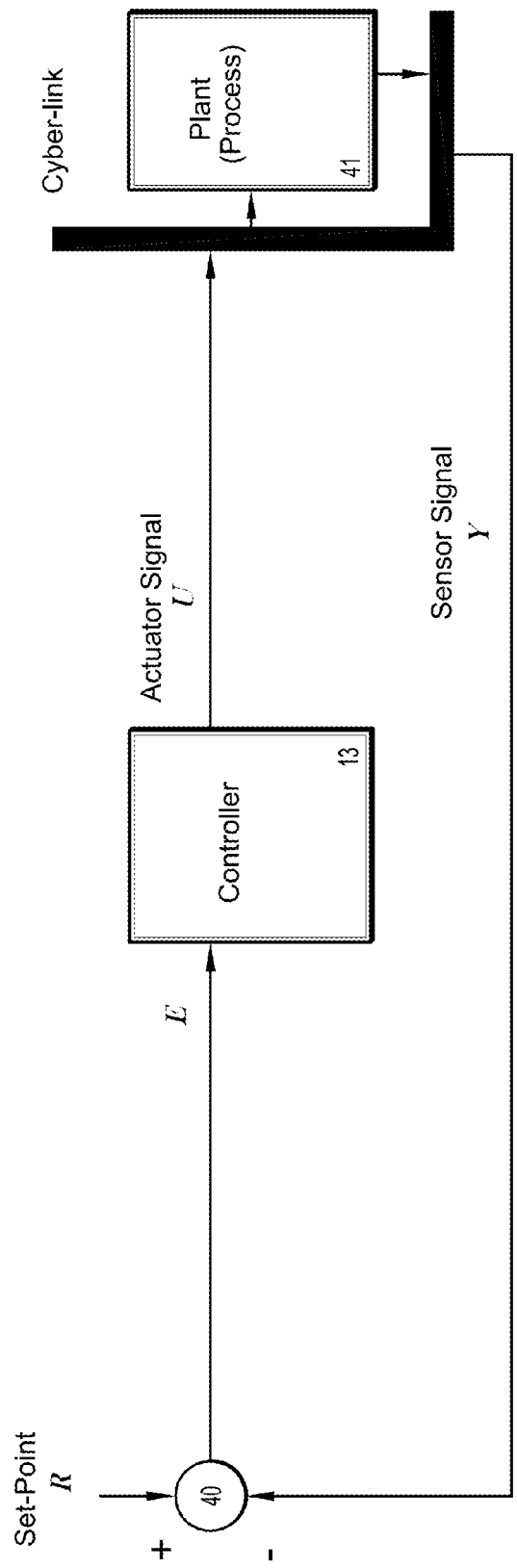
FIG. 4 is a diagram illustrating a feedback control loop 14 for CPS in accordance with exemplary embodiments of the present invention.

FIG. 4 is a diagram illustrating a feedback control loop 14 for CPS in accordance with exemplary embodiments of the present invention. The controller 13 may be designed offline and need not change during run-time. Accordingly, the sampling frequency and other control parameters may be statically set and might not be adjustable during run-time. As shown in this figure, a set-point R may be supplied by either a human user or an automated control algorithm. The set-point may represent a desired operational value. A comparator 40 may compare the supplied set-point R with one or more sensor signals Y supplied from a plant or process chamber 41, which is located within the physical space. Any perceived difference E between the sensor signal Y and the set-point R is sent to the controller 13. The controller uses this difference E to construct commands for the machinery within the plant or processing chamber 41, the commands being designed to influence the physical environment so that the sensor signals Y would be more closely aligned with the set-point R and in this was a control feedback loop is established.

Figure 5:
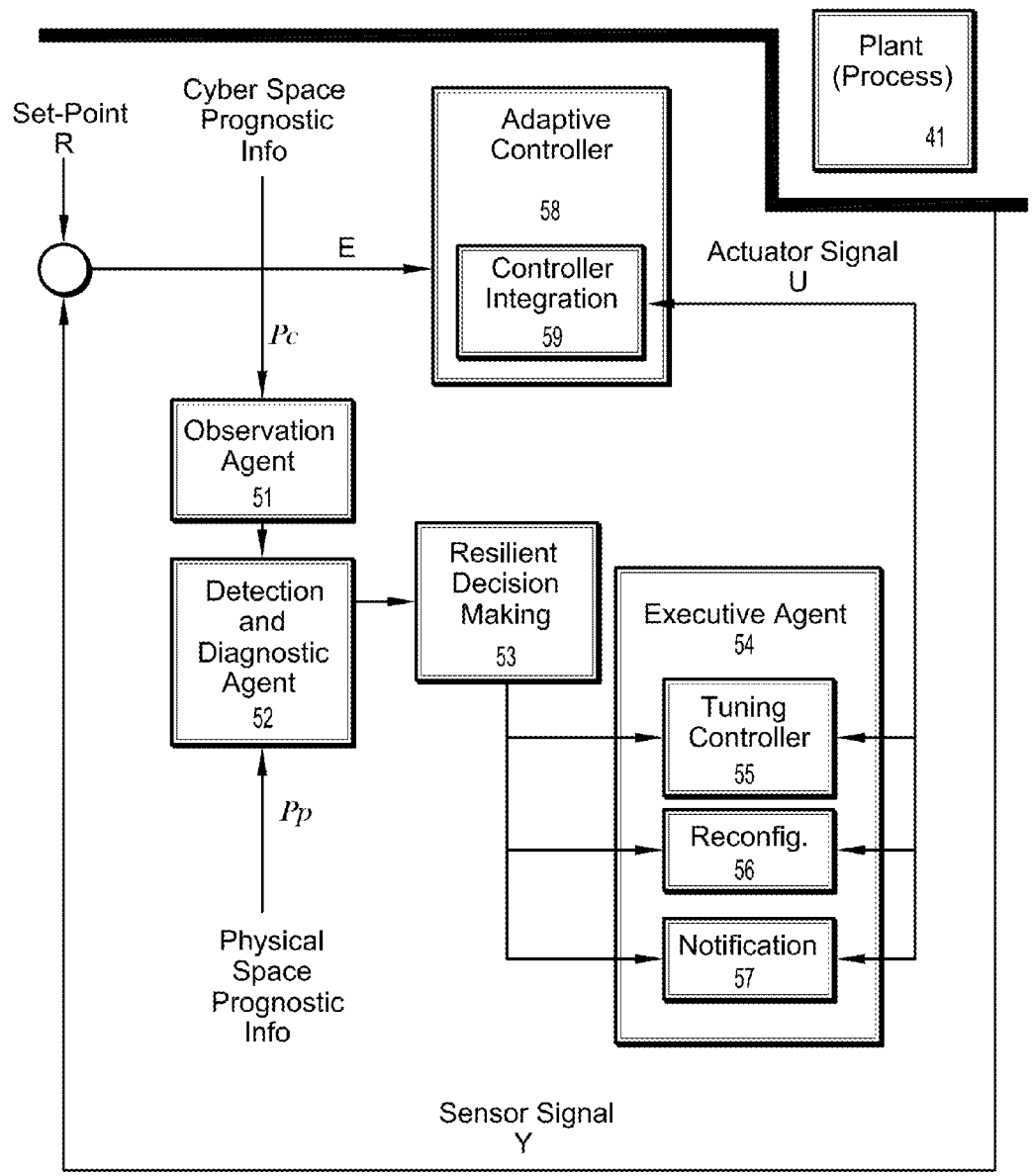
FIG. 5 is a schematic diagram illustrating a CPS framework with RCA feedback control loop integrated in accordance with exemplary embodiments of the present invention.

FIG. 5 is a schematic diagram illustrating a CPS framework with RCA feedback control loop integrated in accordance with exemplary embodiments of the present invention. Here, the resilient control agent (RCA) is made up by the observation agent 51, the detection and diagnostic agent 52, the resilient decision making unit 53, the execution agent 54, and the controller integration unit 59. The Adaptive Controller 58 shown here may be substantially like the controller 13 described above, however, the Adaptive Controller 58 includes the controller integration unit 59.

These RCA components form an RCA loop for the CPS framework. The observation agent 51 works as "sensor" for the cyber space to obtain the prognostic information of the cyber space. This cyber sensing information Pc may be feed into the Detection and Diagnostic Agent 52 for anomaly detection. This information may also be utilized to enable Cyber Adaptive Control Parameter Optimization (CACPO). The observation agent 51 may also implement active cyber security technologies such as Intrusion Detection and Intrusion Prevention.

The Detection and Diagnostic Agent 52 may quantitatively measure system performance degradation and may detect sudden system malfunction based on the sensing data from both the cyber system (Pc) and physical system (Pp). The Detection and Diagnostic Agent 52 may also localize contributing source(s) of a certain failure or anomaly and identifies the type of faults by interpreting the characteristic of the input-output patterns.

The Resilient Decision Making module 53 module may make resilient decisions based on the diagnostic results provided by the Detection and Diagnostic Agent 52. The Resilient Decision Making module 53 may refer to the cyber-physical correlation information which is the connection/mapping between the anomaly from the cyber or physical space and the corrective actions needed to mitigate the impact of the anomaly and maintain system normalcy.

The Execution Agent module 54 may perform response actions to mitigate the impact of the anomalies detected. These actions may include adjusting the adaptive controller through the controller integration method in RCA, performing active cyber actions to thwart the cyber-attacks, and/or providing notification of sensor faults or failures and of replacements needed.

The Execution Agent module 54 may utilize a Tuning Controller module 55 for modifying the control parameters set K. A Reconfiguration module 56 may change the controller sampling period h. A Notification module 57 may be responsible for providing the notifications for sensor faults, sensor failures and items generally requiring service, repair or replacement.

The Cyber Adaptive Control Parameter Optimization (CACPO) may work as a run-time bandwidth scheduler and may dynamically allocate network-bandwidth and control parameter to maintain control loops normalcy and QoP based on the priorities of the CPS loops and availability of the cyber space resource such as network bandwidth.

With the consideration of time-varying sampling frequencies, each CPS in the closed loops as shown in FIG. 3 and FIG. 5 may be described by the following system model.

$$x_i(k+1) = A(h_{i,k})x_i(k) + B(h_{i,k})u_i(k), i=1, \ldots, N, \quad (1)$$

where $x_i(k) \in R^n$ is the state of physical plant/process i, $u_i(k) \in R^m$ is the control input for Control Loop i, $h_{i,k}$ denotes the sampling period of Control Loop i at the time instant k, and $A(h_{i,k})$ and $B(h_{i,k})$ are real matrix functions of $h_{i,k}$ of appropriate dimensions. The sampling period $h_{i,k}$ may be obtained from the bandwidth utilization $b_{i,k}$ to be assigned to Control Loop i at time instant k according to the following equation.

$$b_{i,k} = \frac{\tau_i}{h_{i,k}}, \quad 0 \le b_{i,k} \le 1, \quad \sum_{i=1}^{N} b_{i,k} \le 1 \quad (2)$$

Here, The symbol $\tau_i$ denotes the operation time required to finish a control action for Control Loop i in the best case, which might be limited to the time for data processing such as sampling the sensor, calculating the control output, actuating the actuator, analog-to-digital and digital-to-analog conversions, and the time for transmitting the data packets from the sensor node to the controller node and from the controller node to the actuator node. It may be assumed that the periodic sensor data from the sensor node and the control data from the controller node are packetized to an identical bit length $L_i$. If the data rate of the network medium is R, then the best-case one-way data-transmission time is:

$$T_{i,t} = \frac{L_i}{R}. \quad (3)$$

Here, $T_{i,p}$ may be the time needed for data processing for Control Loop i. The operation time $\tau_i$ can therefore be expressed as:

$$\tau_i = 2T_{i,t} + T_{i,p}. \quad (4)$$

For each known Control Loop i, $T_{i,p}$ and $T_{i,t}$ in the best case can be measured and computed. Thus from Equation (4) it may be assumed that $\tau_i$ is a constant for each control loop The bandwidth utilization/allocation $b_{i,k}$ may be the parameter which indicates the portion of the network bandwidth assigned to Control Loop i at time instant k. If the total network utilization approaches one, the network becomes saturated, and it is difficult to increase the sampling rates of control loops. Then network bandwidth reallocation to rearrange the traffic load is needed if certain control loops require more bandwidth to maintain system normalcy.

From Equation (2), since $\tau_i$ is a constant, smaller $h_{i,k}$ indicates bigger $b_{i,k}$. Therefore Equation (2) follows the fact that a control loop with a higher sampling frequency requires more bandwidth allocation to transfer more data. There may be several special cases, for example, generally $h_{i,k} \ge \tau_i$, i.e., $b_{i,k} \le 1$, when $h_{i,k} = \tau_i$, i.e., $b_{i,k} = 1$, the 100% of the network bandwidth is used by Control Loop i, and no other control loops are allowed to share the network bandwidth. This is the case of CPS with only a single control loop.

For example, when $h_{i,k} = MD_i$, where $MD_i$ is the maximum allowable loop delay (MALP) for Control Loop i, the minimum network bandwidth utilization of Control Loop i is $$(b_{i,k})_{min} = \tau_i / MD_i. \quad (5)$$

Here, the feedback-control performance may directly depend on the loop delay, which is defined as the time interval between the instant when the sensor node samples data and the instant when the actuator actuates the control command. In order to guarantee system stability and adequate control performance, two control measures can be used to determine the maximum allowable loop delay $MD_i$: phase margin $\varphi$ and the closed-loop bandwidth $\omega_{bw}$. To ensure stable and acceptable control performance, the reasonable sampling rate should be at least 20 to 40 times as high as the closed-loop bandwidth $\omega_{bw}$[2], i.e., $20 \le \omega_s/\omega_{bw} \le 40$, where $\omega_s$ is the sampling frequency. Thus the maximum allowable loop delay $MD_i$ for Control Loop i could be estimated by Equation (6):

$$MD_i \approx T_{i,bw}/20, \quad (6)$$

where $T_{i,bw} = 2\pi/\omega_{i,bw}$ and $\omega_{i,bw}$ is the closed-loop bandwidth of control loop i.

The sampling period may alternatively be 4 to 10 times as fast as the rise time $t_r$, for example, $4 \le t_r/h \le 10$, where h is the sampling period. Thus the maximum allowable loop delay $MD_i$ for Control Loop i can also be estimated by Equation (7):

$$MD_i \le t_{i,r}/4, \quad (7)$$

where $t_{i,r}$ is the rise time of closed-loop system i according a step response.

When Control Loop i is in equilibrium, for example, $E_{i,k} \cong 0$, from Equations (5), (6) and (7) there may be minimal bandwidth allocation for Control Loop i as:

$$(b_{i,k})_{min} = 20\tau_i/T_{i,bw}, \quad (8)$$

$$(b_{i,k})_{min} = 4\tau_i/t_{i,r}. \quad (9)$$

The corresponding maximum sampling period may be:

$$(h_{i,k})_{max} = T_{i,bw}/20, \quad (10)$$

or $$(h_{i,k})_{max} = t_{i,r}/4, \quad (11)$$

When there are N control loops, the most available bandwidth that may be assigned to Control Loop i may be calculated according to Equation (12) while the other control loops may be assumed to use their minimum bandwidths:

$$(b_{i,k})_{max} = 1 - \sum_{j \neq i}^{N} (b_{j,k})_{min}. \quad (12)$$

The corresponding minimum sampling period may be:

$$(h_{i,k})_{min} = \frac{\tau_i}{1 - \sum_{j \neq i}^{N} (b_{j,k})_{min}}. \quad (13)$$

In some cases, due to network bandwidth limitation, not all systems may be able to simultaneously obtain enough bandwidth allocation to transfer data and execute at their highest possible sampling frequency. Especially when as a result of adverse cyber conditions such as data drop outs and time delays occur, even less network bandwidth is available. CACPO, in accordance with exemplary embodiments of the present invention seeks to perform optimal bandwidth allocation to obtain the optimal control performance for each closed-loop system and guarantee control normalcy during network disturbances. Exemplary embodiments of the present invention may also provide associated resilient control strategies.

It may be assumed that when a controlled plant is in equilibrium, the pre-assigned execution rate (or sampling period) may not be required. For example, the assigned bandwidth can be reduced for the sake of saving overall bandwidth usage and enhancing the bandwidth utilization by other control loops especially when adverse cyber conditions occur. On the other hand, when a controlled plant is perturbed, increasing its assigned bandwidth by taking the underutilized bandwidths away from other control loops in equilibrium may hasten system recovery from the perturbation and increase its system performance. In the case of mitigating control performance when adverse cyber conditions occur, the control loop which has the highest priority could have the maximum bandwidth available to guarantee the system control normalcy.

Thus exemplary embodiments of the present invention may control system performance and optimize allocation of bandwidth. Here, $E_{i,k}$ denotes the error of Control Loop i at time instant k. A performance criterion that relates control performance, for example, error E, may be defined with bandwidth utilization as in Equation (14):

$$E_{i,k} = f(b_{i,k}) \approx \frac{\beta_i}{b_{i,k}}. \quad (14)$$

where the parameter $\beta_i$ is specific to each control loop and may be determined prior to the implementation of the CPS by evaluating the control performance of each control loop for a broad range of sampling rates or bandwidth allocations. In general, the less bandwidth allocation is, the worse the control performance (e.g., the larger the error).

The CACPO, in accordance with exemplary embodiments of the present invention, may be designed to assign a bandwidth utilization $b_i$ to each control loop according to the control performance and network bandwidth availability such that the overall QoP of the CPS is optimized. The constraint of bandwidth allocation may be $$\sum_{i=1}^{N} b_{i,k} \leq 1,$$

which is to say, the total bandwidth utilization must not exceed the whole network capacity. Then the current additionally available bandwidth utilization may be characterized as:

$$b_a = 1 - \sum_{i=1}^{N} b_{i,k}. \quad (15)$$

At any time k, the following cost function may be formulated to be minimized:

$$J_{i,k} = a_{i,1} E_{i,k}^2 + a_{i,2} b_{i,k}^2, \quad (16)$$

where $a_{i,1}$ and $a_{i,2}$ are the weighting coefficients which are selected during engineering time for a tradeoff between local control performance and bandwidth utilization based on Equation (14). The optimization object of bandwidth allocation may be to find a suitable bandwidth utilization $b_{i,k}$ that can minimize the overall network bandwidth usage and maximize the system performance (for example, to minimize the error). Considering all the control loops, the optimization function $J_k$ for the whole system may become:

$$J_k = \sum_{i=1}^{N} J_{i,k} = \sum_{i=1}^{N} (a_{i,1} e_{i,k}^2 + a_{i,2} b_{i,k}^2), \quad (17)$$

with the constrain $$\sum_{i=1}^{N} b_{i,k} \leq 1.$$

$J_k$ is minimized if each $J_{i,k}$ of the ith control loop is minimized. Substituting Equation (12) into Equation (14) and differentiating $J_{i,k}$ with respect to $b_{i,k}$, the optimal value $(b_{i,k})_{opt}$ may be obtained as:

$$(b_{i,k})_{opt} = \sqrt[4]{\frac{a_{i,1}\beta_i^2}{a_{i,2}}}. \quad (18)$$

The corresponding optimal sampling period may be:

$$(h_{i,k})_{opt} = \frac{\tau_i}{\sqrt[4]{\frac{a_{i,1}\beta_i^2}{a_{i,2}}}}. \quad (19)$$

When adverse cyber conditions are detected, the optimal network allocation might not be guaranteed, resilient control strategies may therefore be used to increase the controller's resilience against these adverse cyber conditions such as data drop outs and time delays. Optimal control parameters according to different cyber conditions may be designed offline and switched on in run-time based on the prognostic information feedback $P_c$ and $P_p$ as shown in FIG. 5.

For time delays, by simulations offline during emerging time, n optimal control parameters according to 1 sets of different time delays in the network/link that maximize the QoP may be found. Then l sets of control parameters may be found and defined as:

$$K_{\tau_l} = (k_1, \ldots, k_{n-1}, k_n)_l, \ l=1,2,3,\ldots \quad (20)$$

Here, each $K_{\tau_l}$ represents the optimal set of n control parameters in terms of QoP according to a specific constant delay $\tau_l$. This l sets of parameters may then be stored in a look-up table in the Execution Agent module 54. The default control parameters set is $K_{0,i}$. The control strategy Tuning Controller 55 may be triggered by the Decision Making Unit 53 to make the adaptive controller switch between different control parameter sets according to the different network time delay situations $T_{i,k}$. During run-time if this time delay is larger than a pre-defined threshold, then the controller tuning is triggered to apply the optimal controller parameter set which match with the real time delay the most in the look-up table.

For data packet drop outs, different sampling periods can be used for the adaptive controller according to the data-packet-drop rate. Here, $i_k$ may be the packet number, and the varying sampling period used in the resilient control algorithm may be given by:

$$h_{i,k+1} = h_{i,k} * (i_k - i_{k-1}), \ i_k \in \{1,2,3,\ldots\}, \quad (21)$$

where $h_{i,k+1}$ is the sampling period will be used in the (k+1)th calculation of the controller i, $i_k$ and $i_{k-1}$ are the packet numbers of the current and the last received data packet, respectively. If there is no packet loss, $h_{i,k+1}$ is equal to $h_{i,k}$.

Figure 6:
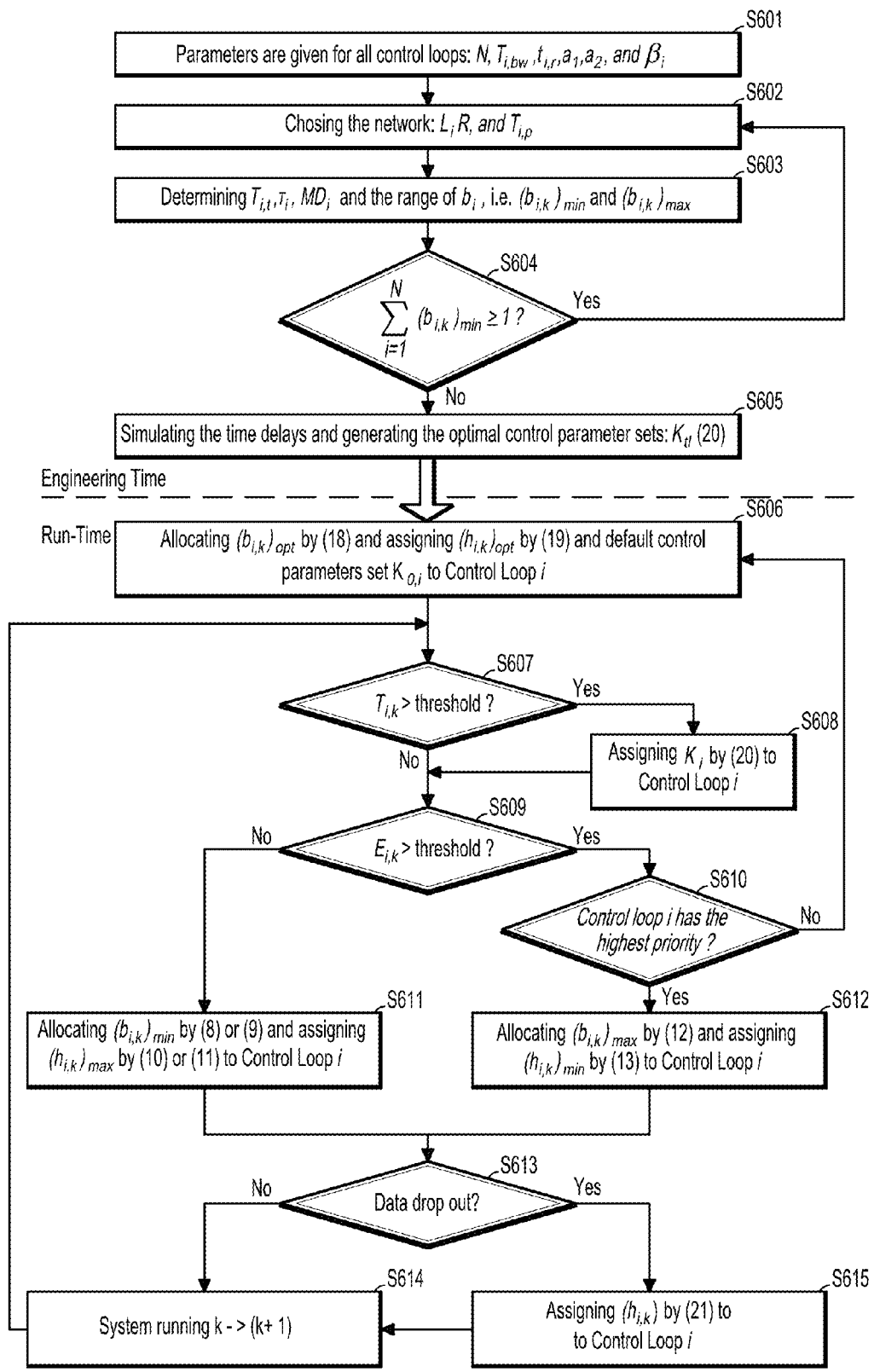
FIG. 6 is a flow chart illustrating an approach for CACPO in accordance with exemplary embodiments of the present invention.

FIG. 6 is a flow chart illustrating an approach for CACPO in accordance with exemplary embodiments of the present invention. This CACPO may be implemented as a part of the resilient control algorithm in each control loop.

At engineering time, for a given physical system with N control loops, physical parameters of each close-loop system like close-loop bandwidth, rise time of step response, and other constant parameters can be chosen, designed, or measured based on the control purpose of each loop (S601). Then, an appropriate network structure may be chosen (Steps S602 to S604). A network with parameters $L_i$, R, and $T_{ip}$ may be chosen (Step S602). Then, various parameters such as $T_{i,t}$, $T_i$, $MD_i$, and the range of $B_i$ may be calculated (Step S603). It may then be determined whether the chosen network can be used based on the network bandwidth constrain (Step S604). If not (No, Step S604), then the process may return to Step S602 and another network structure may be chosen. If yes (Yes, Step S604), then more simulations and tests may be done on the system to obtain the optimal control parameter sets for the control loops as shown in Equation 20 (Step S605). For example, for each control loop, the controllers with three different sampling periods are designed prior to the system implementation.

At run-time, for each control loop i, first, the optimal bandwidth allocation as shown in Equation 18, optimal sampling period as shown in Equation 19, and default control parameters set may be applied (Step S606). Then, during the system run-time, each control loop keeps monitoring the system error and network situation to check if the system error and network time delay are within preset threshold (Step S607 and Step S609). If network time delay is larger than the threshold (Yes Step S607), different control parameter set $K_i$ as shown in Equation 20 may be applied (Step S608). Thereafter, or in the event network time delay is not larger than the threshold (No, Step S607), then it may be checked whether the system error is larger than the threshold due to perturbation (Step S609). If not (No, Step S609), then the minimum bandwidth allocation shown in Equation 8 or 9 and maximum sampling period shown in Equation 10 may be applied (Step S611). If yes (Yes, Step S610), then it may be further checked whether this control loop has the highest priority or not (Step S610). If it does not (No, Step S610), then the original parameters set in (Step S606) is applied. If it does (Yes, Step S610), then the maximum bandwidth shown in Equation 12 and minimum sampling period shown in Equation 13 may be applied, for example, all the currently available bandwidth may be assigned to this control loop to ensure its best QoP (Step S612). Thereafter, it may be checked there is any network data drop out (Step S613). If there is (Yes, Step S613), then the different sampling period as shown in Equation 21 may be applied (Step S615). Otherwise (No, Step S613), the system may go to the next cycle and repeat (Step S614).

Figure 7:
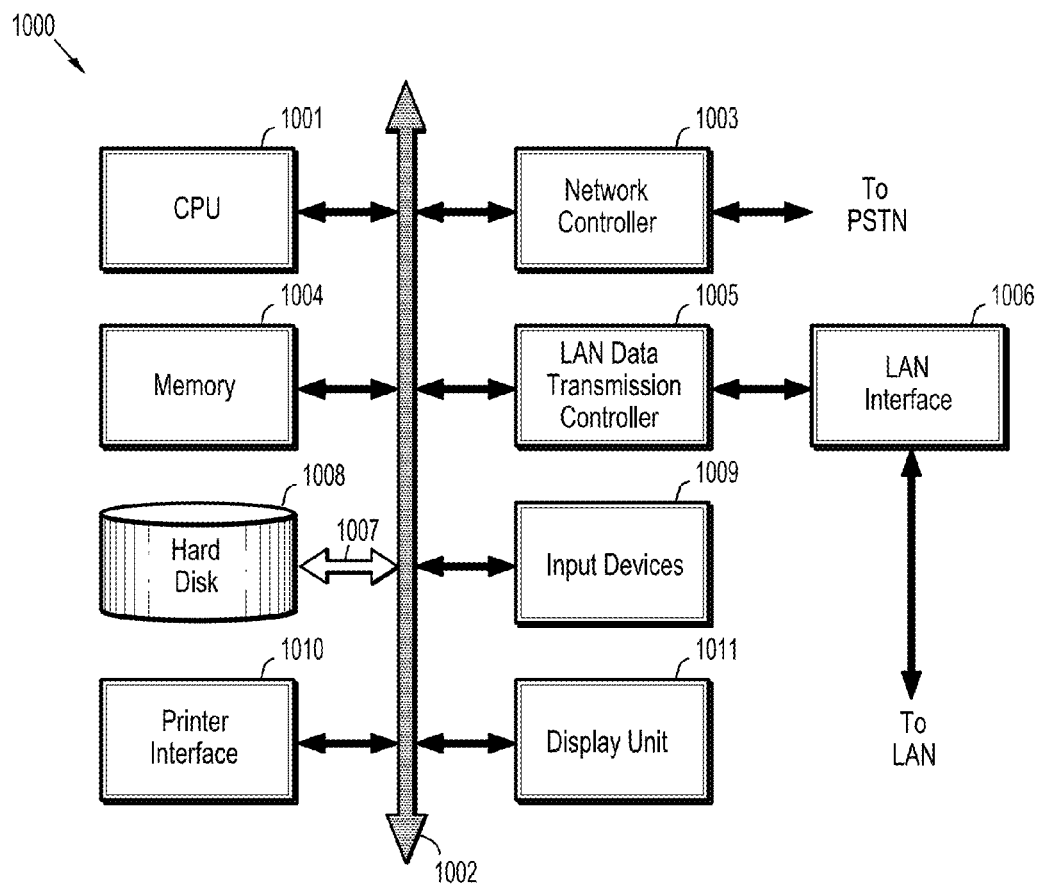
FIG. 7 shows an example of a computer system capable of implementing the method and apparatus according to embodiments of the present disclosure.

FIG. 7 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for controlling a distributed cyber-physical system comprising:
    monitoring a plurality of control loops, each control loop controlling a corresponding physical element within a distributed cyber-physical system, wherein the monitoring comprises considering at least one performance interdependency between the physical element and at least one cyber element in the distributed cyber-physical system;
    determining when one or more of the plurality of control loops experiences an adverse condition;
    performing a cost function optimization to maintain a level of quality of service in the distributed cyber-physical system and calculating a sampling frequency for each of the one or more control loops as a function of the optimization;
    reducing a sampling frequency of those of the plurality of control loops that are not experiencing the adverse condition; and
    increasing a sampling frequency of those of the plurality of control loops that are experiencing the adverse condition.

2. The method of claim 1, wherein each control loop includes the corresponding physical element which is disposed within a physical space and a controller which is disposed in a cyber space.

3. The method of claim 1, wherein each of the plurality of control loops includes:
    receiving a set point;
    receiving a sensor signal from a sensor disposed in a physical space;
    determining an extent to which the received set point aligns with the received sensor signal;
    generating an actuator signal based on the determined extent of difference; and
    driving an actuator disposed in the physical space based on the generated actuator signal.

4. The method of claim 1, wherein determining when one or more of the plurality of control loops experiences an adverse condition is provided based on prognostic information pertaining to either a cyber space or a physical space.

5. The method of claim 1, wherein reducing the sampling frequency includes reducing a number of times that sensor data is transmitted from a physical element within the distributed cyber-physical system to a corresponding controller disposed in a cyber space, per unit time and increasing sampling frequency includes increasing a number of times that sensor data is transmitted from a physical element within the distributed cyber-physical system to a corresponding controller disposed in a cyber space, per unit time.

6. The method of claim 1, wherein the adverse condition is a malicious computer attack.

7. The method of claim 1, wherein the adverse condition is a malfunction or failure of a physical element.

8. A distributed cyber-physical system comprising:
    a plurality of physical elements disposed in a physical space;
    a plurality of controllers disposed in a cyber space, wherein each of the plurality of physical elements corresponds to a corresponding controller of the plurality of controllers;
    a cyber infrastructure, disposed in the cyber space, managing a connection between the plurality of controllers and the plurality of physical elements, wherein a plurality of control loops are established via the cyber infrastructure, each of the control loops comprising a physical element of the plurality of physical elements and a corresponding controller of the plurality of controllers; and
    a resilient control agent configured to:
        monitor each of the plurality of control loops, determine when one of the control loops is experiencing an adverse condition,
        perform a cost function optimization to maintain a level of quality of service in the distributed cyber-physical system and calculate a sampling frequency for each of the one or more control loops as a function of the optimization;
        reduce a sampling frequency of the control loops that are not experiencing the adverse condition, and
        increase a sampling frequency of the control loop that is experiencing the adverse condition, wherein the determining of when one of the control loops is experiencing an adverse condition comprises considering at least one performance interdependency between at least one of the plurality of physical elements and at least one cyber element in the distributed cyber-physical.

9. The distributed cyber-physical system of claim 8, wherein the resilient control agent comprises:
    an observation agent configured to obtain prognostic information of the cyber space;
    a detection and diagnostic agent configured to determine a presence of an adverse condition;
    a resilient decision making module configured to determine when and by how much to increase and reduce sampling frequencies; and
    an execution agent configured to increase and reduce sampling frequencies in the control loops according to the determinations of the resilient decision making module.

10. The cyber-physical system of claim 8, wherein each of the plurality of controller is configured to:
    receive a set point;
    receive a sensor signal from a sensor disposed in a physical space;
    determine an extent to which the received set point aligns with the received sensor signal;
    generate an actuator signal based on the determined extent of difference; and
    drive an actuator disposed in the physical space based on the generated actuator signal.

11. The cyber-physical system of claim 8, wherein the resilient control agent is configured to determine when one of the control loops is experiencing an adverse condition based on prognostic information pertaining to either a cyber space or a physical space.

12. The cyber-physical system of claim 8, wherein the resilient control agent is configured to reduce the sampling frequency by reducing a number of times that sensor data is transmitted from a physical element within the distributed cyber-physical system to a corresponding controller disposed in a cyber space, per unit time and increase the sampling frequency by increasing a number of times that sensor data is transmitted from a physical element within the distributed cyber-physical system to a corresponding controller disposed in a cyber space, per unit time.

13. The cyber-physical system of claim 8, wherein the adverse condition is a malicious computer attack.

14. The cyber-physical system of claim 8, wherein the adverse condition is a malfunction or failure of a physical element.

15. A computer system comprising:
a processor; and
a non-transitory, tangible, program storage medium, readable by the computer system, embodying a program of instructions executable by the processor to perform method steps for controlling a distributed cyber-physical system, the method comprising:
monitoring a plurality of control loops, each control loop controlling a corresponding physical element within a distributed cyber-physical system, wherein the monitoring comprises considering at least one performance interdependency between the physical element and at least one cyber element in the distributed cyber-physical system;
determining when one or more of the plurality of control loops experiences an adverse condition;
performing a cost function optimization to maintain a level of quality of service in the distributed cyber-physical system and calculating a sampling frequency for each of the one or more control loops as a function of the optimization;
reducing the sampling frequency of those of the plurality of control loops that are not experiencing the adverse condition; and
increasing the sampling frequency of those of the plurality of control loops that are experiencing the adverse condition.

16. The computer system of claim 15, wherein each control loop includes the corresponding physical element which is disposed within a physical space and a controller which is disposed in a cyber space.

17. The computer system of claim 15, wherein each of the plurality of control loops:
receives a set point;
receives a sensor signal from a sensor disposed in a physical space;
determines an extent to which the received set point aligns with the received sensor signal;
generates an actuator signal based on the determined extent of difference; and
drives an actuator disposed in the physical space based on the generated actuator signal.

18. The computer system of claim 15, wherein determining when one or more of the plurality of control loops experiences an adverse condition is provided based on prognostic information pertaining to either a cyber space or a physical space.

19. The computer system of claim 15, wherein reducing the sampling frequency includes reducing a number of times that sensor data is transmitted from a physical element within the distributed cyber-physical system to a corresponding controller disposed in a cyber space, per unit time and increasing sampling frequency includes increasing a number of times that sensor data is transmitted from a physical element within the distributed cyber-physical system to a corresponding controller disposed in a cyber space, per unit time.

20. The computer system of claim 15, wherein the adverse condition is a malicious computer attack or a malfunction or failure of a physical element.

* * * * *